No. 805,658. PATENTED NOV. 28, 1905.
J. MOELLER.
BUNSEN BURNER FOR LIGHTING AND HEATING PURPOSES.
APPLICATION FILED AUG. 1, 1904.
3 SHEETS—SHEET 1.
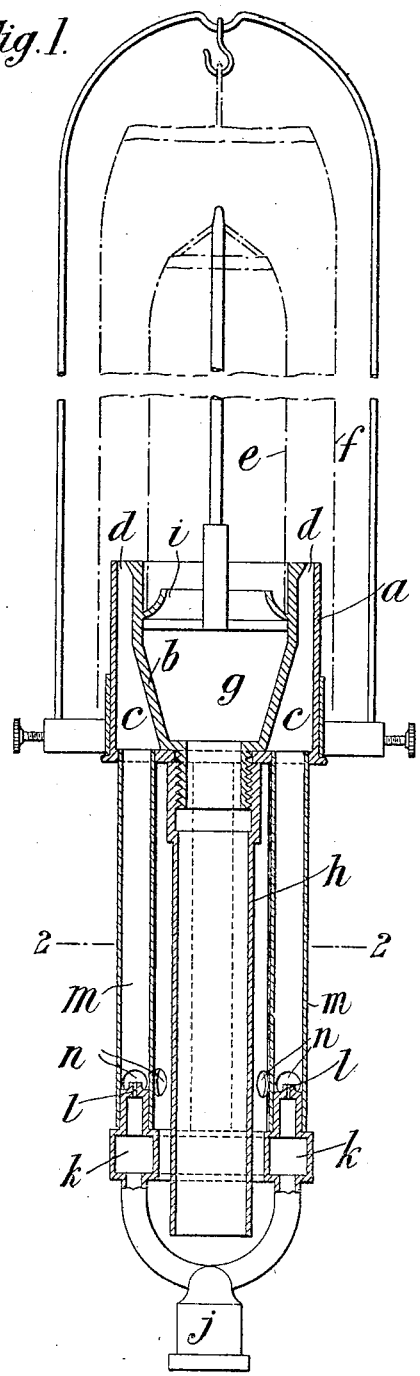
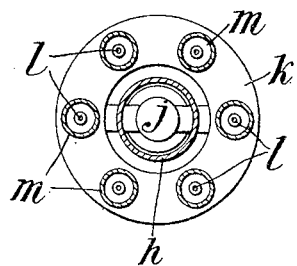
Witnesses
J. K. Moore
E. R. Lusby
Inventor
Julius Moeller
By Whitaker Prevost
attys No. 805,658. PATENTED NOV. 28, 1905.
J. MOELLER.
BUNSEN BURNER FOR LIGHTING AND HEATING PURPOSES.
APPLICATION FILED AUG. 1, 1904.

3 SHEETS—SHEET 3.

UNITED STATES PATENT OFFICE.

JULIUS MOELLER, OF WESTMINSTER, LONDON, ENGLAND.

BUNSEN BURNER FOR LIGHTING AND HEATING PURPOSES.

No. 805,658.  Specification of Letters Patent.  Patented Nov. 28, 1905.

Application filed August 1, 1904. Serial No. 219,091.

*To all whom it may concern:*

Be it known that I, JULIUS MOELLER, a subject of the Emperor of Germany, residing at Victoria Mansions, 26 Victoria street, Westminster, London, England, have invented new and useful Improvements in Bunsen Burners for Lighting and Heating Purposes, of which the following is a specification.

This invention relates to Bunsen gas-burners for incandescent lighting and heating to produce an exceedingly hot flame, and chiefly to burners designed for use with two mantles arranged concentrically and wherein the head of the burner is provided with a chamber into which the inner mantle depends and into which a supply of air is introduced, so that the inrushing air does not impinge upon the lower part of the inner mantle—such, for example, as described in the specification of my former application, Serial No. 211,621—the object of my present invention being to provide novel means for introducing the supply of fresh air into the said inner chamber and also for introducing a complete mixture of combustible gas and air into the space between the two mantles, whereby a very high state of incandescence is obtained.

Figure 4:
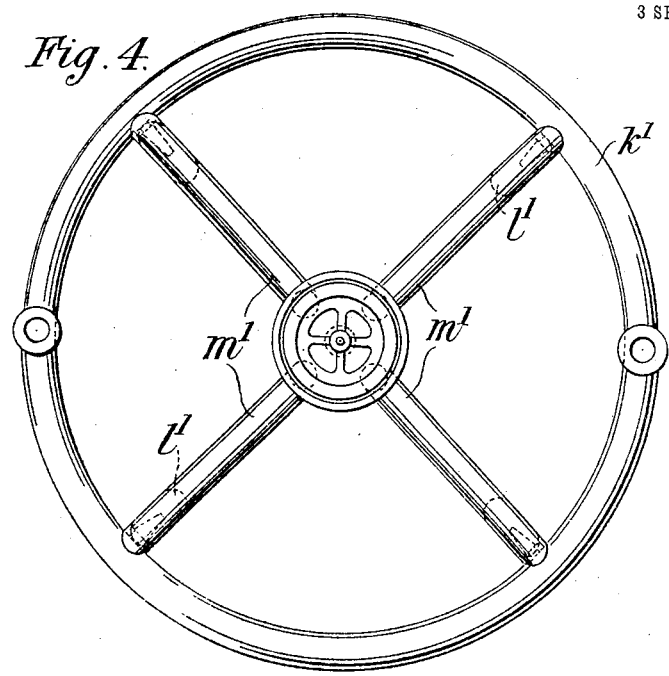
Figure 3:
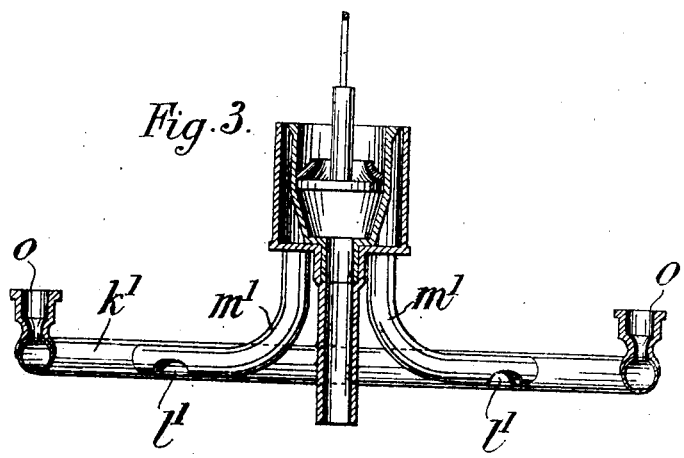
Figure 5:
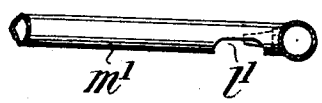
Figure 6:
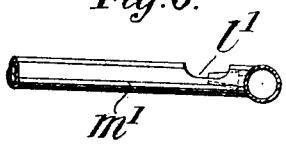
Figure 7:
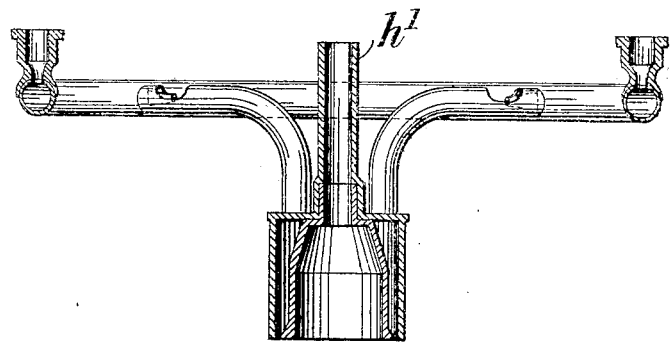
Figure 8:
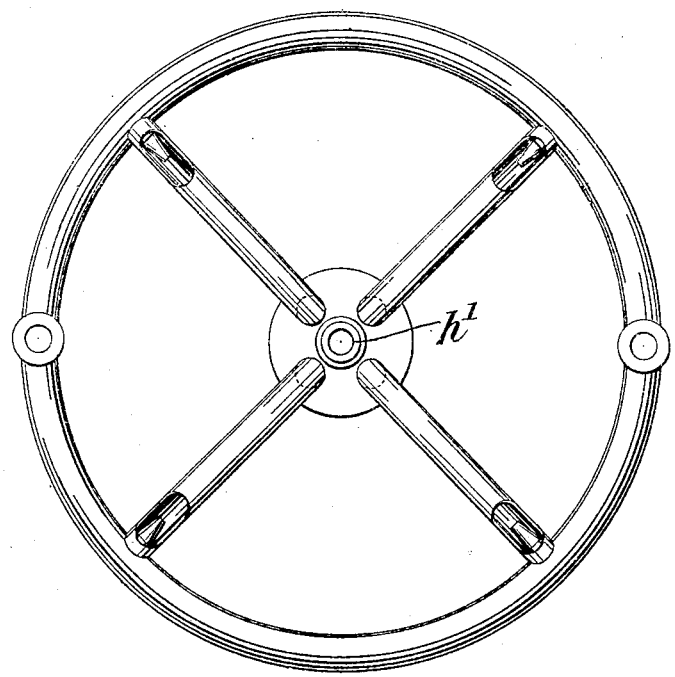

In the accompanying drawings, Figure 1 is a sectional elevation of a burner having two mantles supported at the upper end of the same; and Fig. 2 is a section on the line 2 2, Fig. 1. Fig. 3 is a sectional elevation of a different form of burner from that shown in Fig. 1, and Fig. 4 is a plan of the same. Fig. 5 is a view of a detail. Fig. 6 is a view similar to Fig. 5, but illustrating a slight modification. Fig. 7 is a view of a burner of the type shown in Figs. 3 and 4, but inverted for use with depending mantles. Fig. 8 is a plan of the same.

$a$ is the outer wall of the head of the burner, and $b$ is the inner wall, which is concentric with the wall $a$, the space between the said walls having at its upper part the annular slit $d$, at which the combustible mixture issues and burns between the two mantles $e\ f$, the former of which has its lower end depending into the space within the wall $b$ and the latter having its lower end surrounding the wall $a$. The chamber $g$, inclosed by the wall $b$, is at its upper end in open communication with the interior of the mantle $e$ and at its lower end is connected to a central air-pipe $h$, through which a supply of fresh air can pass directly into the chamber $g$ and the inner mantle.

$i$ is a shield below the end of the mantle $e$ for directing the current of air into the center of the said mantle.

$j$ is the gas-inlet, which communicates with an annular chamber $k$ carrying a series of gas-nipples $l\ l$, surrounded by tubes $m\ m$, which are connected to the chamber in the head of the burner. The annular chamber $k$ is made of such a size that it will always contain a small volume of gas under the same pressure that exists in the gas-main, and consequently the size of the said chamber will vary more or less according to the size of the burner.

The holes in the nipples through which the gas escapes must all be of the same size and at a uniform height. Air-holes $n\ n$ are formed in the tubes $m\ m$ adjacent to the said nipples in the ordinary manner. It will be understood that the diameter of the head of the burner will vary according to the number of nipples and tubes with which the burner is provided and the quantity of gas to be used.

The arrangement of the nipples and tubes hereinbefore described allows of an extremely hot flame being produced, as, owing to there being no impediment placed to the flow of the gas or air, a very large proportion of air is introduced, and thus produces an almost explosive flame. The mixture of air and gas passes into the chamber $c$ and issues from the annular slit $d$ as a ring-shaped flame, and at the same time air is drawn in through the central tube $h$ and passes into the chamber $g$ and thence into the inner mantle $e$, so that the flame burning at the slit $d$ is surrounded by a column of air both from the outside of the outer mantle and the inside of the inner mantle, and thus burns with perfect combustion, and consequently causes a high state of incandescence in the mantles.

It will be noticed that the upper end of the inner wall $b$ is formed with an inclined lip at an angle of twelve to fifteen degrees, so that a large volume of gaseous mixture is allowed to rise almost to the slit $d$ before issuing from the same, whereby any retardation of the flow of the mixture owing to surface friction is obviated.

I can arrange the burner hereinbefore described with horizontal gas-inlet tubes, as shown in Figs. 3 and 4, this arrangement being very advantageously employed for lighting billiard-tables. In this modification I substitute for the annular chamber $k$, hereinbefore described, a ring $k'$ of much larger diameter than the burner, the tubes $m'\ m'$, through which the combustible mixture passes from this ring $h'$ to the burner-head, being bent to an angle, as shown in Fig. 3. $o\ o$ are sockets formed upon the ring $h'$, to which the gas-supply can be connected. Each pipe $m'$ instead of being formed with a series of holes for admitting air, as hereinbefore described, is advantageously formed with a single aperture $l'$ adjacent to the nipple, which aperture may be below the nipple, as shown in Figs. 3, 4, and 5, or above the nipple, as shown in Fig. 6.

The modification of my invention shown in Figs. 7 and 8 differs only from the arrangements hereinbefore described in that the burner-head is inverted, so that the mantles may depend from it instead of being supported upon it. In this modification, however, the pipe $h'$ instead of serving for the admission of air serves for the escape of products of combustion, the air-supply being admitted through the inner mantle.

Having now fully described and ascertained my said invention and in what manner the same is to be performed, I declare that what I claim is—

1. An incandescent gas-burner having a head provided with a chamber, a passage connected therewith and leading to the open air, said chamber being surrounded by a second chamber, an annular chamber connected with a gas-supply, and pipes connecting said annular chamber with the said second chamber, said connecting-pipes being provided with means for mixing air with the gas passing through them, substantially as described.

2. An incandescent gas-burner having means for supporting two incandescent mantles, one within the other, and being provided with a chamber connected with the open air and having a baffle-plate within the same, a second chamber provided with a burner-orifice between the said mantles, a third chamber annular in form connected to a gas-supply, and also connected with the second chamber by pipes each provided with means for mixing air with the gas passing through it, substantially as described.

JULIUS MOELLER.

Witnesses:
JOHN E. BOUSFIELD,
C. G. REDFERN.